United States Patent Office 3,336,300
Patented Aug. 15, 1967

3,336,300
1,2,3,4-TETRAHYDRO-5H-BENZODIAZEPIN-5-ONES
Arthur A. Santilli, Ardmore, Del., and Thomas S. Osdene, Berwyn, Pa., assignors to American Home Products Corporation, New York, N.Y., a corporation of Delaware
No Drawing. Filed Apr. 13, 1965, Ser. No. 447,889
4 Claims. (Cl. 260—239.3)

This application is in part a continuation of our previous application Ser. No. 330,251 filed Dec. 13, 1963, now abandoned.

The invention herein disclosed relates to compositions of matter classified in the art of chemistry as benzodiazepines and to processes and intermediates for making such compounds.

In its first principal composition aspect, the claimed invention resides in chemical compounds having the 1,2,3,4-tetrahydro-5H-1,4-benzodiazepin-5-one nucleus and having in the 2-position a phenyl group or its hereinafter disclosed equivalents.

A second principal composition aspect of the claimed invention resides in the concept of a chemical compound having a molecular structure in which there is attached to the 2-position of the 3,4-dihydro-5H-1,4-benzodiazepin-5-one nucleus a phenyl group or its hereinafter disclosed equivalents.

A third composition aspect of the claimed invention resides in the concept of chemical compounds suitable as intermediates in the production of the principal composition aspects of the invention; which compounds have the 2-aminobenzamide nucleus to which is attached on the nitrogen atom of the amide group a phenacyl group.

The invention sought to be patented, in its process aspect, resides in the concept of sequence of reactions including: cyclizing a 2-amino-N-(phenacyl) benzamide to form a 3,4-dihydro-5H-1,4-benzodiazepin-5-one having in the 2-position a phenyl group and reducing this compound in the 1-2 position to form the corresponding 1,2,3,4-tetrahydro-5H-1,4-benzodiazepin-5-one.

The tangible embodiments of the principal composition aspects of this invention possess the inherent physical properties of being crystalline solids, are substantially insoluble in water, and are generally soluble in polar solvents such as lower aliphatic alcohols. Examination of compounds produced according to the hereinafter described process reveals data confirming the molecular structure hereinbefore set forth. For example, the C=O frequency in the diazepine nucleus is evident from infrared analysis. The aforementioned physical characteristics taken together with the nature of the starting materials and the mode of synthesis positively confirm the structure of the compositions sought to be patented.

The tangible embodiments of the invention possess the inherent applied use characteristic of exerting qualitatively varying therapeutic effects in experimental animals as evidenced by pharmacological evaluation according to standard test procedures. These tangible embodiments show psycholeptic effects including anticonvulsant and central nervous system depressant activity.

The manner and process of making and using the invention will now be generally described so as to enable a person skilled in the art of chemistry to make and use the same.

Referring now to Scheme A, the starting 2-amino-N-(phenacyl)benzamide (IV) can be prepared by forming an acetophenone oxime (I) and reacting it with p-toluenesulfonyl chloride to form the corresponding p-toluenesulfonate ester (II).

The latter reaction is preferably carried out in the cold below 10° C. Water and ice are added to precipitate the product. This product (II) is then stirred with cooling in alcohol containing sodium alkoxide. The reaction mixture is filtered and the filtrate is acidified. The aqueous phase is evaporated to dryness. The product is dissolved in alcohol, the solution is filtered and evaporation of the filtrate yields the corresponding ω-aminoacetophenone hydrochloride (III). Reaction of this product (III) with an isatoic anhydride in the presence of an alkali metal carbonate such as sodium carbonate yields a 2-amino-N-(phenacyl)benzamide (IV).

The isatoic anhydrides and the acetophenone oximes employed in making the 2-amino-N-(phenacyl)benzamides used herein are known or are readily prepared by procedures well known to those skilled in the art of organic chemistry.

The tangible embodiments of the present invention having a 1,2,3,4-tetrahydro-2-phenyl-5H-1,4-benzodiazepin-5-one nucleus (VI) are made by heating a 2-amino-N-phenacylbenzamide (IV), prepared as above described, in a dry inert solvent such as xylene. Preferably, the reaction is carried out at the boiling point of the reaction mixture in apparatus provided with means for continuously removing the water of reaction as it forms. The product of this reaction, a 3,4-dihydro-2-phenyl-5H-1,4-benzodiazepin-5-one (V), is obtained by filtering the reaction mixture, adding petroleum ether until turbid, and cooling. This product is suspended in a cold medium containing a reducing agent such as lithium aluminum hydride in anhydrous tetrahydrofuran and thoroughly mixed with stirring, and then refluxed. The reaction mass then is cooled in ice, made basic with aqueous alkali and filtered. The filtrate is dried to obtain the tetrahydro product.

It will be apparent to those skilled in the art to which the invention appertains that certain of the carbon and nitrogen atoms of the starting benzamide can be substituted with groups which do not interfere with the cyclization reaction. Therefore, in the process of the invention, all such benzamides can be employed as starting materials in the process of making aspect of this invention.

Similarly, the phenacyl moiety of the benzamide, which moiety provides the 2 substituent in the final product, can have on any available position on the aromatic ring one or more noninterfering substituents, as for example, but without limitation, alkyl, haloalkyl, halogen, sulfamyl and alkylsulfamyl. It will be obvious upon considering the reactions herein involved that the above-enumerated substituents which can be present in the starting compounds do not enter into any reaction during the process of the invention.

When the starting benzamides are substituted as hereinbefore recited, it will be apparent to those skilled in the art that the final products formed by the process of the invention will correspondingly bear the same substituents. Compounds bearing the hereinbefore recited substituents are fully equivalent to the compositions of matter particularly claimed herein.

Examples 1–6 below, illustrate the invention specifically for the preferred embodiment shown in the flow diagram.

EXAMPLE 1

*Preparation of o-chloroacetophenone oxime (I)*

To a solution of 20 g. of o-chloroacetophenone in 80 ml. of 95% ethanol add a solution of 14.5 g. of hydroxylamine hydrochloride in 25 ml. of water. To this mixture add 40 g. of a 50% solution of potassium hydroxide solution. Heat the reaction mixture under reflux for 4 hr. and allow to stand overnight at room temperature. Add the reaction mixture to ice and water and acidify the pH 2 to obtain a precipitate and remove by filtration. Weight of dried product 17.4 g., M.P. 112–114°. Recrystallize from cyclohexane to give a product with M.P. 113–114°.

EXAMPLE 2

*Preparation of o-chloroacetophenone oxime, p-toluenesulfonate ester (II)*

To a stirred solution of 3.4 g. of o-chloroacetophenone oxime in 10 ml. of dry pyridine add 3.8 g. of p-toluenesulfonyl chloride while keeping the reaction temperature below 10°. Allow the reaction mixture to warm up to 30° over a period of 3½ hr. Add ice and water to the reaction solution to deposit an oil which on standing solidifies to afford 5.8 g. of product, M.P. 79–82°.

EXAMPLE 3

*Preparation of o-chloro-ω-aminoacetophenone hydrochloride (III)*

Add a solution of 0.44 g. of sodium metal in 15 ml. of ethanol dropwise and with stirring to a slurry of 5.8 g. of o-chloroacetophenone oxime, p-toluenesulfonate ester in 5 ml. of ethanol. Cool the reaction mixture in ice during the addition and allow to stand for 2 hrs. Discard the precipitate. Add ether (50 ml.) and 5% hydrochloric acid (30 ml.) to the ethanolic solution. Evaporate the aqueous phase to dryness in a rotary evaporator. (Residue 4.2 g., M.P. 170–173°.) Dissolve the product in ethanol and filter the solution. Upon evaporation of the filtrate in vacuo, obtain 1.4 g. of product, M.P. 170–174°. Recrystallize this material from alcoholic HCl to obtain 1.2 g., M.P. 173–174°.

EXAMPLE 4

*Preparation of 2-amino-N-(o-chlorophenacyl) benzamide (IV)*

To a solution of 2.5 g. of sodium carbonate in 75 ml. of water add 5 g. of o-chloro-ω-aminoacetophenone hydrochloride. To the stirred solution add 3.95 g. of isatoic anhydride. After warming for 5 min. on the steam-bath, filter the reaction mixture affording 4.7 g. of product. Recrystallize from benzene to give the analytical sample, M.P. 104–106°.

EXAMPLE 5

*Preparation of 2-o-chlorophenyl-3,4-dihydro-5H-1,4-benzodiazepin-5-one (V)*

Boil a solution of 6.0 g. of 2-amino-N-(o-chlorophenacyl)benzamide in 100 ml. of xylene under reflux in an apparatus equipped with a Dean-Stark tube. When further water evolution ceases, filter the xylene solution and add petroleum ether to the point of turbidity. Cool to obtain 3.4 g. of product. Recrystallize from benzene petroleum ether to afford an analytical sample, M.P. 152–153.5°.

EXAMPLE 6

*Preparation of 2-o-chlorophenyl-1,2,3,4-tetrahydro-5H-1,4-benzodiazepin-5-one (VI)*

The reduction of 2-o-chlorophenyl-3,4-dihydro-5H-1,4-benzodiazepin-5-one with lithium aluminum hydride in tetrahydrofuran affords 2-o-chlorophenyl-1,2,3,4-tetrahydro-5H-1,4-benzodiazepin-5-one.

The following examples illustrate the preparation of other compounds of the invention, all melting points being in degrees centigrade.

EXAMPLE 7

*Preparation of 2-amino-5-chloro-N-phenacyl-benzamide*

Add 17.3 g. of 5-chloroisatoic anhydride and 4.7 g. of sodium carbonate to a stirred solution of 15 g. of 2-aminoacetophenone hydrochloride in 60 ml. of water. Allow the reaction mixture to stand overnight at room temperature. Filter the reaction mixture under suction to give a product, M.P. 130–140°. Recrystallize from cyclohexane-benzene to give 2-amino-5-chloro-N-phenacylbenzamide, M.P. 148–150°.

EXAMPLE 8

*Preparation of 7-chloro-3,4-dihydro-2-phenyl-5H-1,4-benzodiazepin-5-one*

Add 2-amino-5-chloro-N-phenacylbenzamide (5.9 g.) to 150 ml. of dry xylene. Heat the reaction mixture with stirring to the boiling point, collecting the water which was given off in a Dean-Stark water separator. After the water separation is completed, filter the reaction mixture. Cool the filtrate in ice to obtain a crystalline product, M.P. 155–165°. Recrystallize from xylene to give 7- chloro-3,4-dihydro-2-phenyl-5H-benzodiazepin - 5 - one, M.P. 160–162°.

EXAMPLE 9

*Preparation of 7-chloro-1,2,3,4-tetrahydro-2-phenyl-5H-1,4-benzodiazepin-5-one*

Add dropwise a solution of 5.5 g. of 7-chloro-3,4-dihydro-2-phenyl-5H-1,4-benzodiazepin-5-one in 50 ml. of anhydrous tetrahydrofuran to a stirred, ice-cold suspension of 1.14 g. of lithium aluminum hydride in 200 ml. of anhydrous tetrahydrofuran. When the addition is completed, stir the reaction mixture at room temperature for 2 hours and then heat under reflux for 1 hour. After cooling in ice, add 30 ml. of 50% aqueous tetrahydrofuran cautiously, followed by 25 ml. of sodium hydroxide solution. Filter the reaction mixture and evaporate the filtrate to dryness on a rotary evaporator. Triturate the oily residue with 15 ml. of ethyl acetate to obtain a crystalline product (1.18 g.), M.P. 159–166°. Recrystallize from ethyl acetate to give 7-chloro-1,2,3,4-tetrahydro-2-phenyl-5H-1,4-benzodiazepin-5-one, M.P. 170–173°.

The products of this invention may be administered parenterally or orally and may be combined with diluents, solvents, suspending agents, fillers, excipients, adhesives, coloring and flavoring materials, etc., as desired for the preparation of convenient unit dosage forms.

What is claimed is:
1. 2-o-chlorophenyl - 3,4 - dihydro-5H-1,4-benzodiazepin-5-one.
2. 2-o-chlorophenyl - 1,2,3,4 - tetrahydro-5H-1,4-benzodiazepin-5-one.
3. 7-chloro - 3,4 - dihydro-2-phenyl-5H-1,4-benzodiazepin-5-one.
4. 7-chloro - 1,2,3,4 - tetrahydro-2-phenyl-2H-1,4-benzodiazepin-5-one.

No references cited.

JOHN D. RANDOLPH, *Primary Examiner.*
WALTER A. MODANCE, *Examiner.*
ROBERT T. BOND, *Assistant Examiner.*